Aug. 6, 1940.     W. A. DOBSON     2,210,569
TYPEWRITING MACHINE
Filed Jan. 19, 1938     7 Sheets-Sheet 1

INVENTOR
WILLIAM A. DOBSON,
BY L. G. Julihn
ATTORNEY

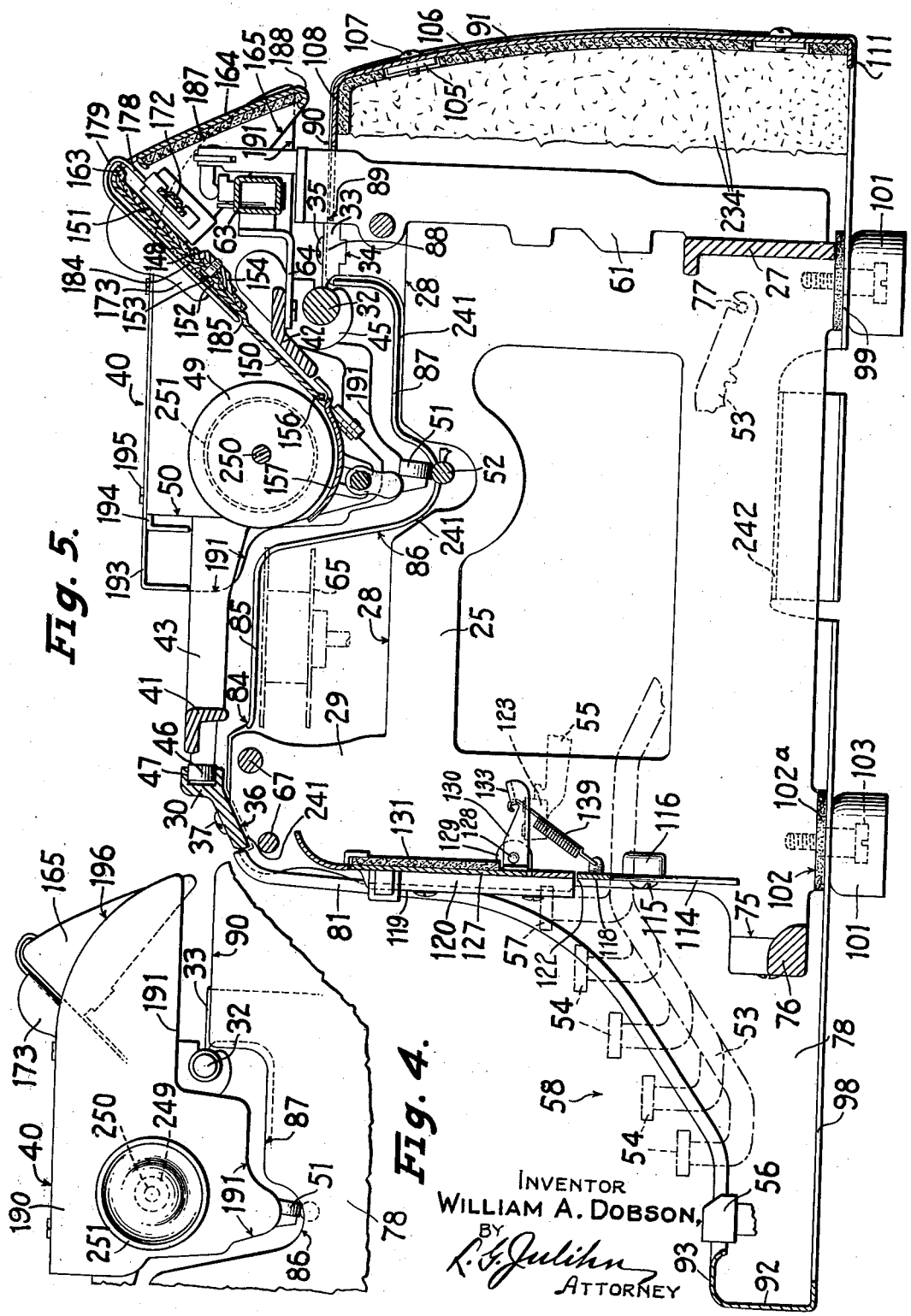

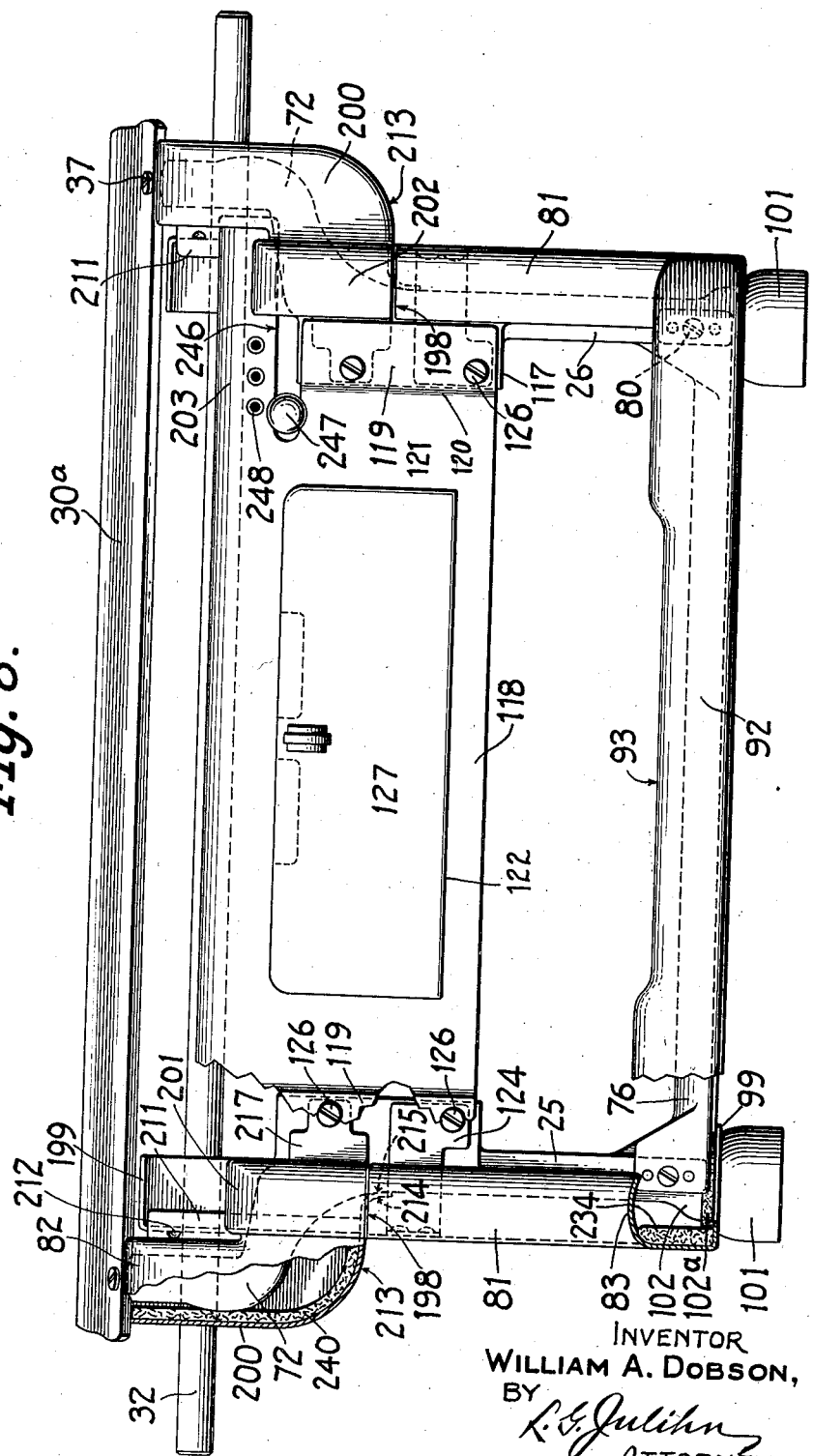

INVENTOR
WILLIAM A. DOBSON,
BY
ATTORNEY

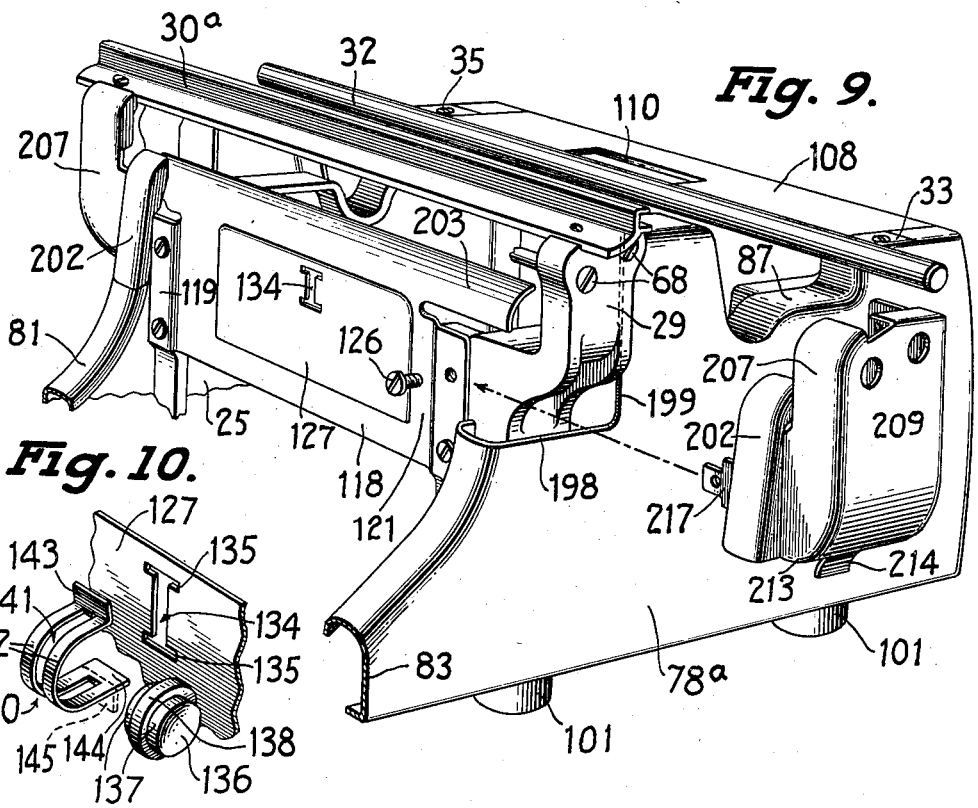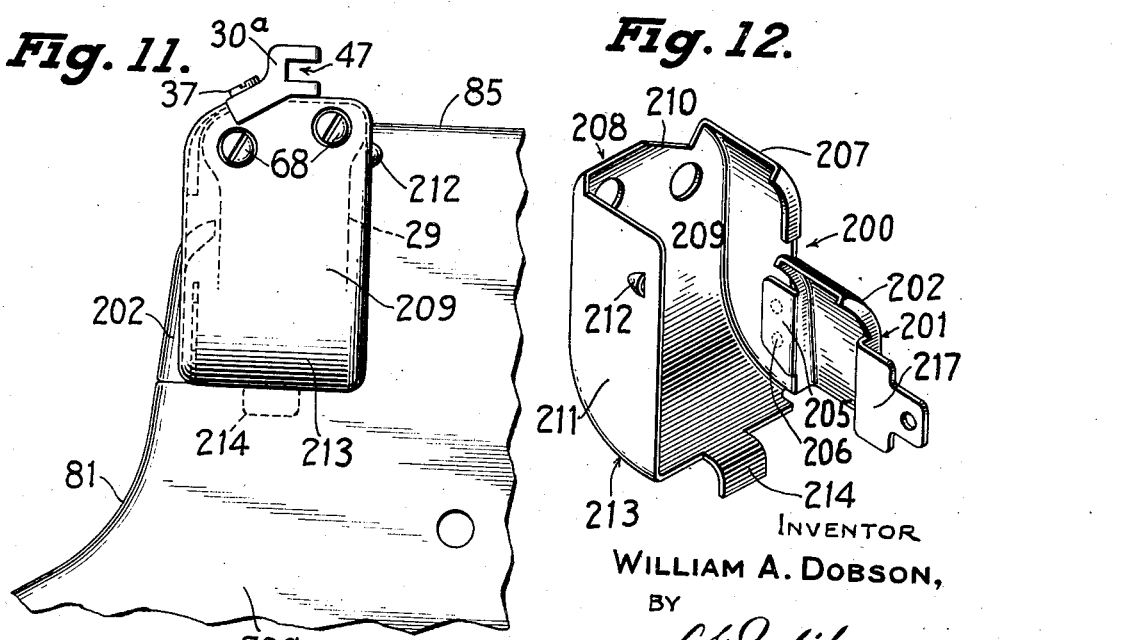

Aug. 6, 1940.    W. A. DOBSON    2,210,569
TYPEWRITING MACHINE
Filed Jan. 19, 1938    7 Sheets-Sheet 6
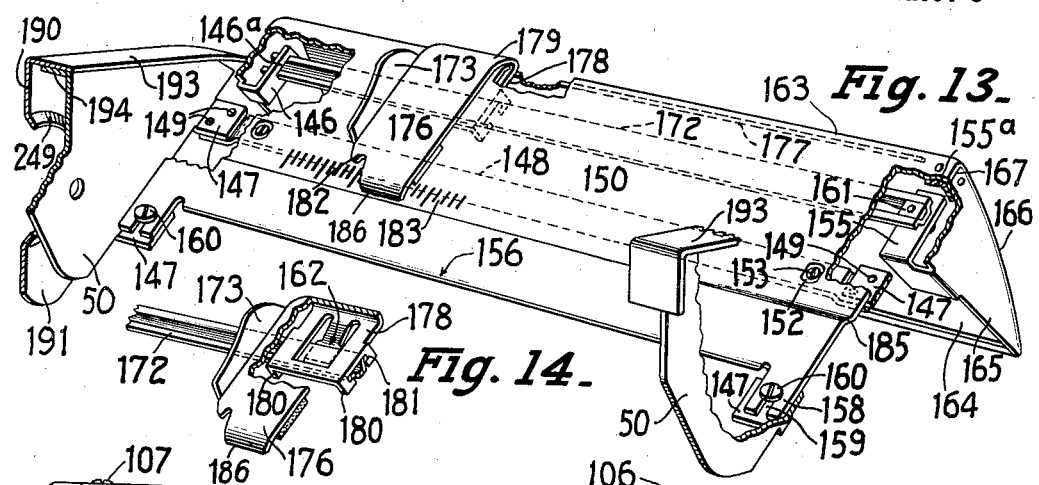
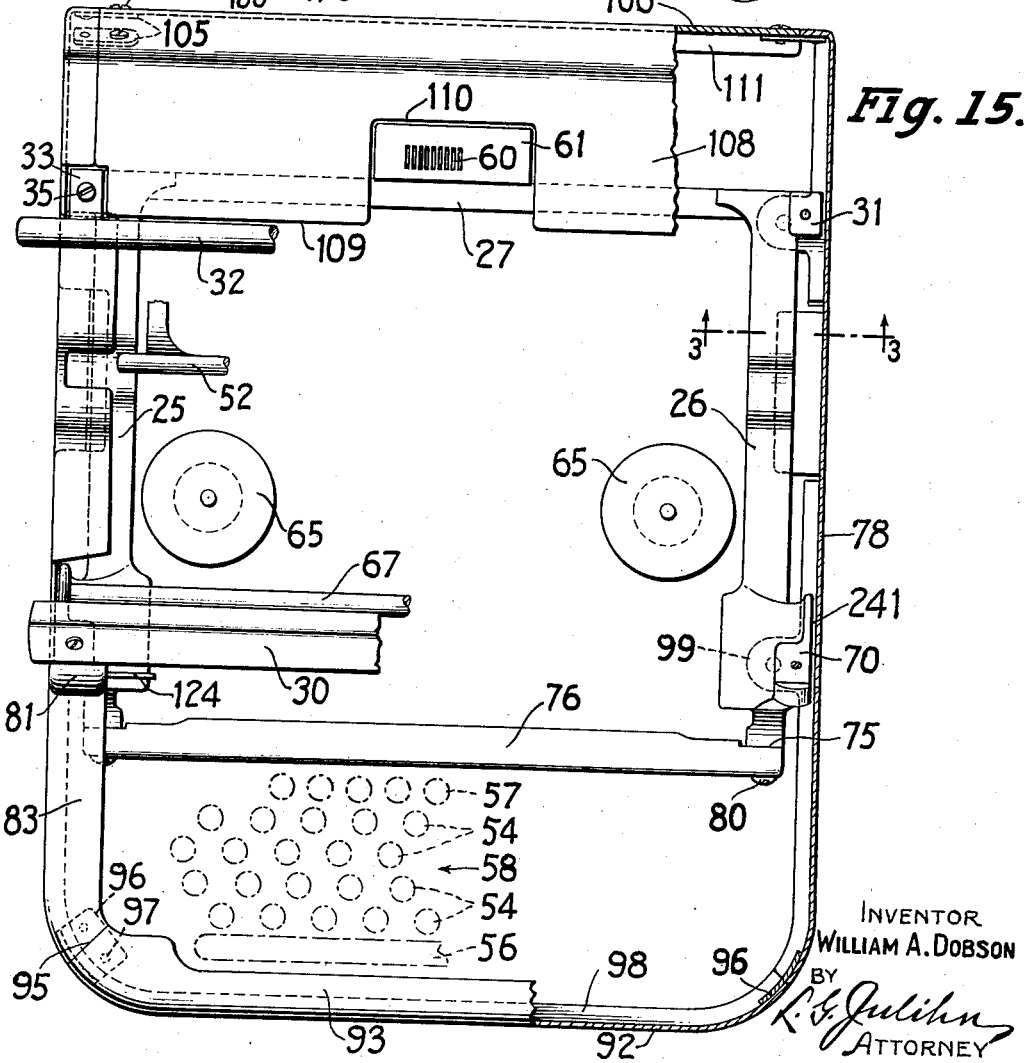
INVENTOR
WILLIAM A. DOBSON
BY
L. G. Julihn
ATTORNEY

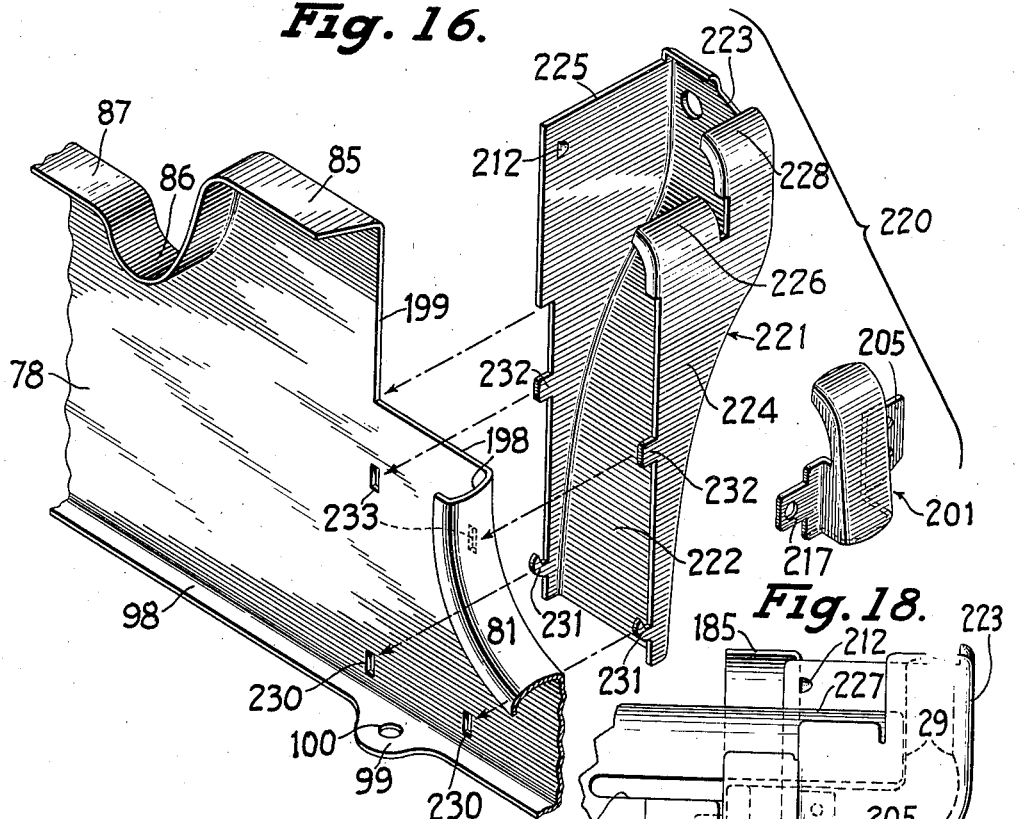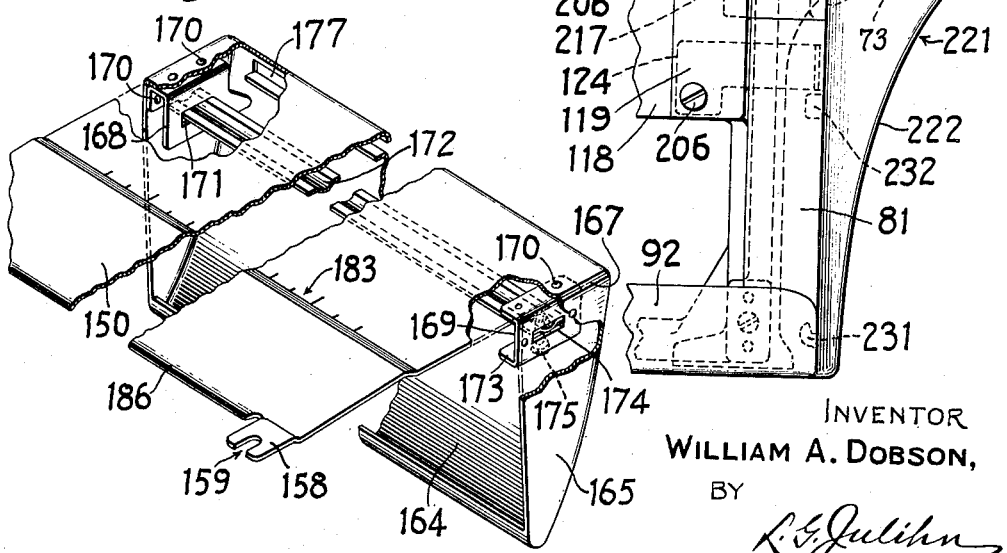

Patented Aug. 6, 1940

2,210,569

UNITED STATES PATENT OFFICE 2,210,569

TYPEWRITING MACHINE

William A. Dobson, Wethersfield, Conn., assignor to Underwood Elliott Fisher Company, New York, N. Y., a corporation of Delaware Application January 19, 1938, Serial No. 185,724

2 Claims. (Cl. 197—186)

This invention relates to frame and mask structure for typewriting machines in which a carriage travels laterally relatively to the body of the machine.

The invention deals particularly with the problem of masking the body mechanism and carriage mechanism of a typewriter such as the Underwood wherein a main frame for the body supports the printing-instrumentalities and other mechanisms, and the carriage structure travels laterally of the main frame.

A feature of the invention resides in arranging the mask structure so that for machines having typing carriages of different lengths, a principal part of the mask serves for any one of such machines irrespective of the carriage length, but which principal-mask part may receive supplemental-mask elements or casings adapted to mask carriage-rail-supporting arms or horns that extend laterally from, and are usually a part of the main frame. Since the carriage-rail may vary in length according to the different lengths of the carriage, said arms or horns may also vary in their lateral extent or spread from said main frame or body of the machine. The supplemental-mask members may be differently proportioned so as to mask said different arms or horns and so that these arms or horns, like the main frame, need not be expensively finished.

The principal-mask part has sides having forwardly extending toe-parts that are spanned at their front ends by a cross-sill and serve with the latter to hem or frame the keyboard. Therefore, the usual keyboard-framing part of the main frame may be dispensed with. Said keyboard-framing part of the main frame being dispensed with, the usual side-members of the latter may be strongly connected by a simple cross-bar which may be disposed at the front of said side-members, immediately behind the keyboard, and near the base of the machine so that the usual key-levers may extend rearwardly thereover from the keyboard.

The principal-mask-part sides having the forwardly-extending keyboard-side-framing toes, may originally be separate pieces; and the cross-sill for framing the front of the keyboard may also originally be a separate piece. These separate pieces may be adapted to be permanently connected as by end-matched joints where the side-sills meet the front toe-parts of the mask sides. The separate pieces may be permanently attached at said joints as by riveting, soldering, brazing or spot-welding. These pieces, since they are originally separate, may be produced economically and by means of forming dies of moderate cost. But the invention is not limited to making the principal-mask part sides and the cross-sill of separate pieces, since, as far as certain other features of the invention are concerned, said sides and cross-sill may be struck up in one piece from a single blank.

A feature of the invention resides in arranging the mask to cover mechanism that is usually disposed at the back of the machine or its main frame. An example of such mechanism is the column of denominational tabulating stops mounted, as in the Underwood machine, in a fixture attached to the back of the main frame, the tabulating mechanism also comprising structure that is disposed on the carriage.

The carriage carries the usual revoluble platen and also carries a rear paper-table that slopes downwardly and forwardly toward the bottom of the platen to support a work-sheet and guide it for rear insertion around the platen. Said rear paper-table spans the usual carriage-end members. Viewed from the front of the machine, the paper-table masks mechanism, such as tabulating-stop structure carried by the carriage at the back thereof. But viewed from the back of the machine, such mechanism is usually exposed. A further feature of the invention resides in completely masking such mechanism, and, to this end, the paper-table may have depending therefrom, or meeting its rear top edge, an apron, said paper-table and apron thus forming a masking shed or canopy. The apron may conform with with a rear wall of the principal-mask part. Said rear wall may span the sides of the principal-mask part and may be attached thereo. Further, said rear wall may be spaced from the back of the typewriter frame so as to provide room for mechanism at the back of the typewriter frame such as the aforesaid denominationl tabulating-stop mechanism; said rear wall thus cooperating to mask said mechanism. Although the lower edge of the apron on the carriage and the upper edge or part of said rear wall are made contiguous to gain the effect of an unbroken rear masking wall for the entire machine structure, it will be understood that said apron and rear wall are free from one another in order to permit lateral travel of the apron with the carriage.

A side paper gage is adjustable transversely of the paper-table, and a further feature of the invention is in provision whereby the side paper gage is supported, and is guided for transverse adjustment at the underside of the paper-table so that the paper-table masks said construction.

Members on and at the end of the carriage are adapted to mask the carriage ends and, for this purpose, to co-operate with ends that form masking enclosures connecting the paper-table and its adjacent rear apron. These carriage-end masking members may be adapted to match and harmonize with the contours of the sidewalls of a principal-mask part, it being further contrived to have said mask-side-wall contours closely hem the path of the carriage so as to get the utmost masking effect.

For giving access to the types, the principal or universal-mask part may have a displaceable type cover or door, and another feature of the invention resides in novel inexpensive construction of a finger-piece or knob for said door, and which construction produces a knob having lineaments harmonizing with the lineaments of the improved mask structure.

Other features and advantages will hereinafter appear.

In the accompanying drawings:

Figure 4 is a fragmentary side view of the machine showing the masking features for the carriage ends and the harmonious conformation of said features with the contour of the principal-mask-part side.

Figure 5 is a cross-sectional side elevation of the machine and shows a principal-mask part, the masking features on the carriage, and the arrangement for masking mechanism, at the back of the machine, such as the illustrated tabulating mechanism.

Figure 6 is a front elevation showing the principal-mask part, and, attached thereto, the supplemental-mask members for arms or horns that support a carriage having certain length greater than standard; one of said supplemental-mask members and the principal-mask part being shown partly broken away and in section to illustrate details.

Figure 9 is a perspective showing the principal-mask part and the supplemental-mask member of Figure 7 in detached relation, to illustrate details.

Figure 10 is a perspective illustrating details of the novel finger-knob for the door or cover that gives access to the types.

Figure 11 shows, in side elevation, the supplemental-mask member of Figures 6 and 7 in place against the principal-mask part.

Figure 12 is a perspective of the supplemental-mask member as viewed from a direction opposite to that of Figure 9.

Figure 13 is a perspective showing the rear paper-table, the rear masking apron associated therewith, and the paper side gage and supporting features for the latter, parts being shown broken away and sectioned, to bring out details.

Figure 14 is a perspective showing details of the paper side gage and its connection with a supporting bar, parts being shown broken away and sectioned, to illustrate details.

Figure 15 is a top plan showing, in assembled relation, the main frame and the principal-mask part for a machine having a standard-length carriage, parts being broken away and sectioned, to bring out details.

Figure 16 is a perspective showing parts of one of the various supplemental-mask members, and the mask wall in separated relation, to bring out details.

Figure 17 is a perspective of the masking shed formed by the rear paper-table and rear apron thereon, and illustrates structure for supporting a side gage, the view being shown broken away and sectioned in parts, to illustrate details.

Figure 18 is a front elevation view showing the Figure 16 parts in assembled relation with the main frame.

Figure 1:
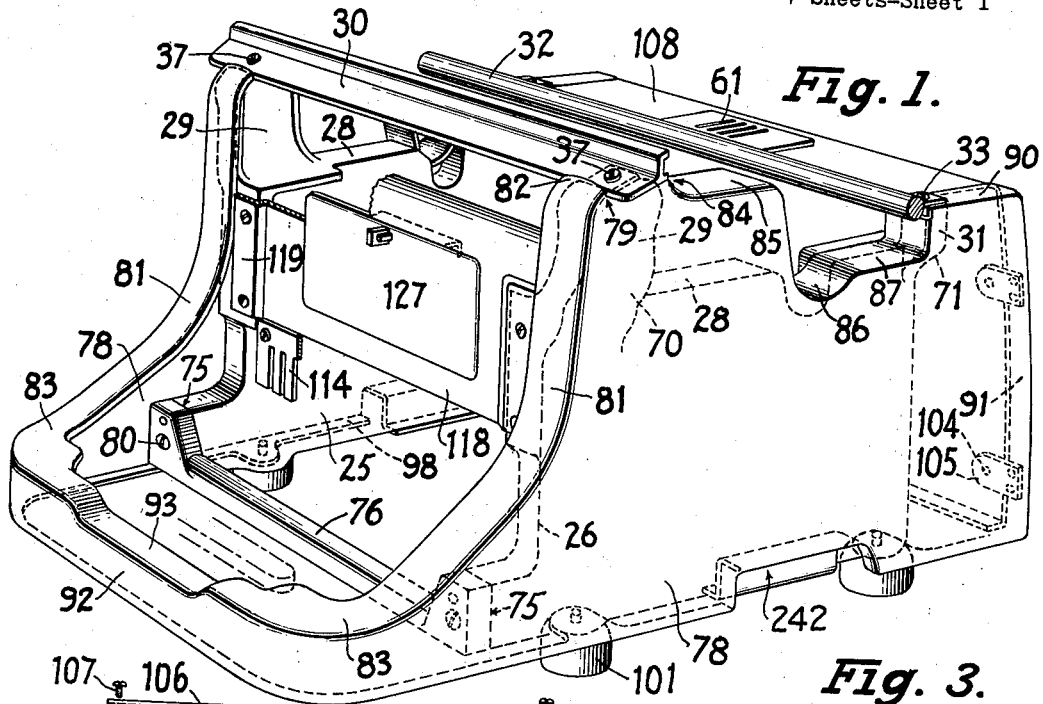
Figure 1 is a perspective illustrating the frame and principal-mask part disposed around said frame, the arrangement being for a machine having a carriage of standard length.

In a typewriter such as the Standard Underwood, the working parts are supported in a main frame that includes left and right members 25, 26, and a frame-back-forming cross-member 27 rigidly joined to, and co-operating to hold said side-members in laterally-spaced relation. Each side-member 25 or 26 has a top rim or edge 28 above which rises, in the front, a horn 29 for supporting a front carriage-rail 30, and at the rear there rises above said top rim a horn 31 for supporting a rear carriage rail 32, the latter having rearwardly-extending plates 33 seated as at 34, Figure 5, upon the tops of the rear horns 31 and secured by screws 35. The front carriage-rail 30 is seated upon the front horns 29 as at 36 and is secured by screws 37.

The typewriter carriage 40, Figures 4 and 5, includes a frame having as its parts a front bar 41, a rear bar 42 and side-end members 43. The rear bar 42 has depending lugs 45 slidably fitting the rear carriage-rail 32; and the front bar 41 is provided with rollers 46 fitting a channel 47 cut along a rear face of the front rail 30; the typewriter carriage being thus adapted to travel upon said rails 30, 32.

A revoluble platen 49, Figure 5, is journaled in left and right end plates 50, see also Figure 13, of a frame having the usual connections (not shown) to the carriage frame 41—43 in order to be movable relatively to the latter for case-shifting; and a roller 51 on the case-shiftable frame runs upon the usual shift rail 52 that is movable up and down and forms part of the Underwood case-shift mechanism.

The key-levers 53, Figure 5, mount numeral and alphabet type-keys 54 and are operatively connected by suitable means, not shown, to type-bars 55 to swing the latter upwardly and rearwardly, from their normally cumbent position, Figure 5, to print against the platen 49. At operation of any type-bar 55, or of a space-key 56, the usual escapement-mechanism (not shown) co-operates to letter-feed the carriage. Said type-keys 45, the space-key 56 and denominational tabulating keys 57 constitute the usual keyboard 58 at the front of the machine, Figures 5 and 15.

Denominational tabulating stops 60, Figure 15, are mounted in a column-like fixture 61 shown attached, Figures 5 and 15, to the back of the main-frame crossbar 27. Said denominational stops 60 co-operate with counter-stop mechanism 63, Figure 5, mounted on the carriage by means of brackets 64. The arrangement of said counter-stop mechanism, the denominational tabulating stops 60, and the connection of the latter to the denominational tabulating keys 57 presents mechanism, part of which is at the back of the machine as, for example, the fixture 61, and part of which is mounted on the carriage as, for example, the counter-stop mechanism 63. The types print through a ribbon (not shown) which winds off and on to ribbon spools 65, which, in the Underwood machine, are located as in Figures 5 and 15.

Cross-rods 67 may be threaded through and supported by the framework-horns 29 and may be retained in the latter as by means of screws 68 that may also serve to adjust the rods endwise, said rods, in the Underwood machine, mounting the usual carriage-travel-limiting margin-stops (not shown).

For a machine having a carriage of standard length, say, for an 11-inch-long platen, and, therefore, hereinafter described as an 11-inch carriage, the front-rail horns 29 flare or reach outwardly as at 70, Figure 1, so as to support the front carriage rail 30 at points that are spaced apart more than are the bodies of the frame side-members 25, 26. Similarly, the rear horns 29 flare outwardly as at 71, Figure 1, so as to support the rear rail 32 at points that are spaced farther apart than are the bodies of the side-members 25, 26.

For a machine having a longer carriage, say, for a 12-inch platen, the front horns 29 are spaced from the bodies of the side-members 25, 26 by longer lateral reaches 72, Figures 6 and 9, so as to support the longer carriage rail 30 at more widely-spaced points than in the 11-inch-carriage machine. For the still wider or 14-inch-carriage machine, the front horns 29 are spaced apart by still longer reaches 73, Figure 18. It will be understood, then, that the horns 29 may have lateral reaches of different extents corresponding to the length of the carriage. The maximum reach herein shown by way of illustration is seen at 74 in Figure 8. The rear horns 31 for the rear carriage rail 32 are herein shown as having the same lateral reaches for all machines. But it will be understood that the lateral reaches of the rear horns 31 may also vary, if desired, according to the length of the carriage and its rear rail 32.

The novel frame and mask structure will now be described.

The main-frame side-members 25, 26 are made so that their forward extent ends as at pads 75 and thus extends forward no farther than substantially the back of the keyboard 58, this being in distinction from former machines in which the side-members were prolonged forwardly and were connected by a front cross-sill of the main frame to hem or frame the sides and front of the keyboard, such as 58. Instead of such former cross-sill the present construction includes a cross-member 76 that is attached as at 80, Figure 1, to said pads 75 and is near the base of the machine, Figure 5, so that the key-levers 53 extend rearwardly thereover to a fulcrum-rod 77, Figure 5, near the back of the machine.

A mask for the main body of the machine includes left and right side-walls 78. For an 11-inch-carriage machine the side-walls are adapted to conform with the under-part contour of the front carriage rail 30 as is indicated at 79, Figures 1 and 5, and the inner faces of these side-walls may be close to the outer sides of the front horns 29 of such 11-inch-carriage machine. Since these horns do not project much beyond the bodies of the main-frame side-members 25, 26, the entire side area of the side-wall 78 may be substantially flat and therefore in the same vertical plane as the part of the side-wall that is adjacent to the horn 29, as illustrated in Figure 1. Thus, the lateral spacing of the flat-area side-walls 78 corresponds substantially with the lateral spacing of the outer sides of the horns 29 for an 11-inch-carriage machine.

Referring to Figures 1 and 15, each side-wall 78 has an inwardly-turned flange 81 and is shaped so that said flange is contiguous to the front edge of the rail 30, as at 82, and slopes abruptly downwardly therefrom and then turned forwardly to form a sill or toe 83, that hems and frames the side of the keyboard. Another inward-turned flange-part of each side-wall 78 starts at a point 84, Figures 1 and 5, adjacent the back of the horn 29 and extends horizontally rearwardly, as at 85, and then drops and turns, as at 86, to a lower horizontal part 87 conforming with, and in overlying contiguity to, the top rim 28 of the main frame 25 or 26. From the part 87 the flange continues upwardly to a break 88 that ends at 89 and clears the rear horn 31. The flange continues after the break 88, 89, in a rearwardly horizontal part 90 and from the latter there continues downwardly a back flange 91 of the side-wall 78.

The keyboard-framing toes 83 of the mask side-walls 78 are joined at their forward ends to a cross-sill 92 that hems or frames the front of the keyboard 58. Said cross-sill 92 has an inwardly-turned flange 93 that matches the flanges 81 of the side-walls 78. The side-walls 78 and the cross-sill 92 are originally separate pieces, said pieces being preferably struck up from sheet metal. For joining and attaching said pieces, the ends of the cross-sill 92 and the forward ends of the side-wall toes 83 are mitered as indicated at 95, Figures 2 and 15, to form butt joints. The joints may be made secure as by soldering, brazing or welding. Overlap plates 96 may be placed at the joints to secure them. In Figure 15 spot-welding of the overlap plates to the cross-sill 92 and to the side-wall toes 83 is indicated at 97. After they are joined together the side-walls 78 and the cross-sill 92 form a unitary part.

The bottom edge of the side-walls 78 and cross-sill 92 may also be in the form of an inwardly-turned flange 98. Said bottom flange 98 may have ears 99 adapted, as by means of perforations 100, to be clamped between cushioning feet 101 and foot bosses 102 of the main-frame sides 25, 26 as in Figure 5. A screw 103 projects from each foot through the ear 99 and may be threaded into the foot boss 102. A washer 102ª of sound-deadening material, such as felt, faces each foot boss 102 so as to be interposed between the latter and the ear 99 for preventing transmission of machine-sound vibrations to the mask 78, 106. For this latter purpose, also, the perforations 100 in the ears 99 are made large enough so that said ears 99 do not contact the foot screws 103 and, therefore, the foot screws 103 may be shouldered directly against the foot boss 102, as in Figure 5.

The rear edge flanges 91 of the side-walls 78 have secured to their inner surfaces, as by weld spots 104, tabs 105, Figures 1 and 15, that form seats for attaching a rear wall or cover 106 of the mask. Said rear wall 106 is removably attached to said tabs by screws 107 and may be substantially flush with the side-wall-rear-edge flanges 91 as indicated in Figure 5. At its top the rear wall 106 is bent forwardly to form a top-masking part 108 that is flush with the inwardly-turned flange part 90 of the side-walls. Said top-masking part 108 extends forwardly to a line slightly separated, for sound-vibration insulation, from the rear carriage-rail 32, as is indicated at 109, Figure 15, said top part having a cut-out 110 to receive and frame the tabulating-stop fixture 61, the latter preferably rising above said top-masking part as indicated in Figure 5 or in Figure 1. The rear wall 106 has an inturned bottom-edge stiffening flange 111.

For masking the space between the margin-stop supporting cross-rods 67 and a key-lever comb-plate 114 that is attached as by screws 115 to bosses 116 of the main-frame side-members 25, 26, the construction may be as follows, Figures 1, 5, 6, 7 and 9: Each side-member 25, 26 presents a forwardly-facing pad or boss 117. A masking-plate 118 has side margin-portions 119 that are offset, as at 120, forwardly of a plate-portion 121 that is between said margin-portions 119. Said masking-plate 118 has a rectangular opening 122 arranged to give access to the array of types 123 on the type-bars 55, the latter being normally cumbent in their usual arcuate array, as diagrammatically indicated at Figure 5.

Figures 2, 3:
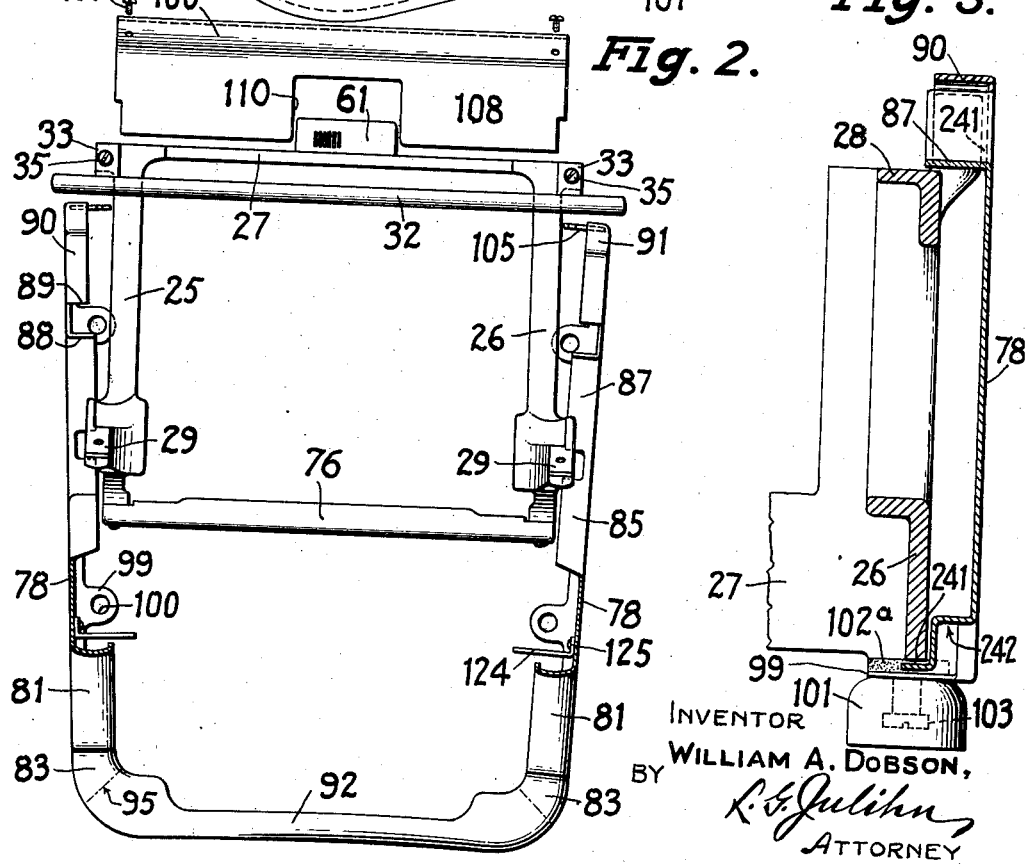
Figure 2 is a plan view of the parts seen in Figure 1, but showing the main frame and the principal-mask part with its rear wall detached and the principal-mask-part sides sprung apart laterally to pass the main-frame side-members.
Figure 3 is a sectional front elevation of the main-frame side-member and the principal-mask-part side adjacent to said side-member, the section being taken on the trace 3—3, Figure 15.
Figure 7:
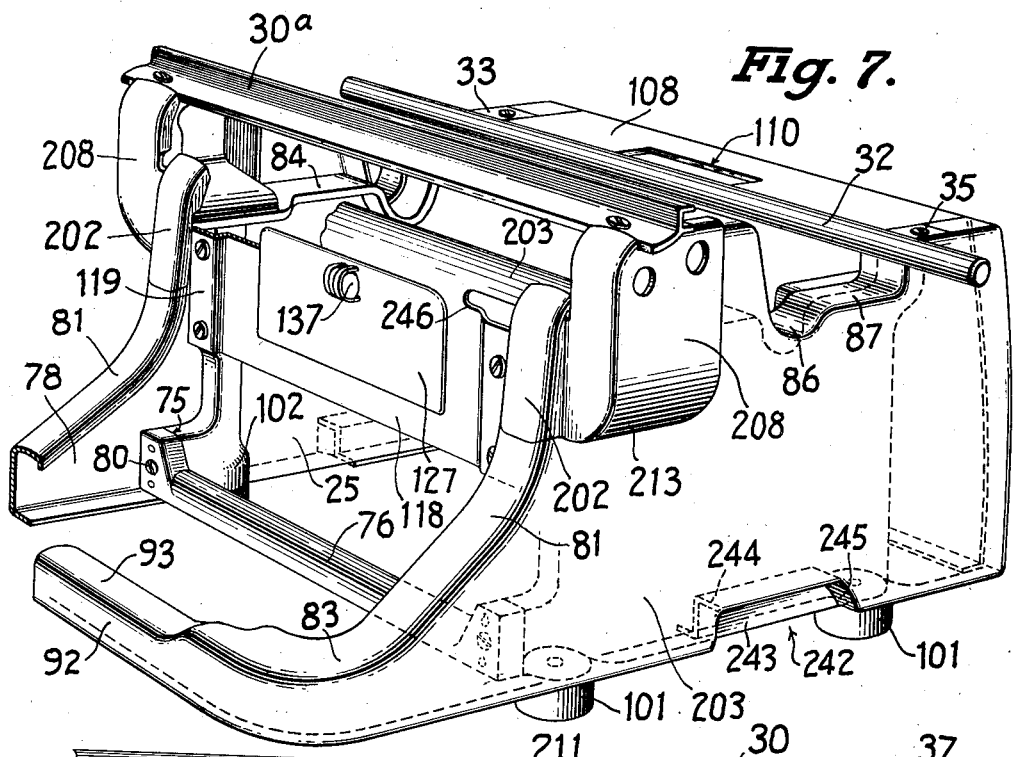
Figure 7 is a perspective of the principal-mask part and supplemental-mask members seen in Figure 6.

Extending inwardly from the mask walls 78 are wings or fins 124, substantially as seen in Figures 2 and 6 and attached to the side-walls as by spot-welding or riveting 125. Said fins 124 serve for attaching the mask side-walls 78 to the frame side-members 25, 26 and are adapted to receive screws 126 that also secure the masking-plate 118 to said side-members 25, 26, said fins 124 being between the screw-receiving margin-portions 121 of said plate 118 and the bosses 117, Figure 6.

Figure 8:
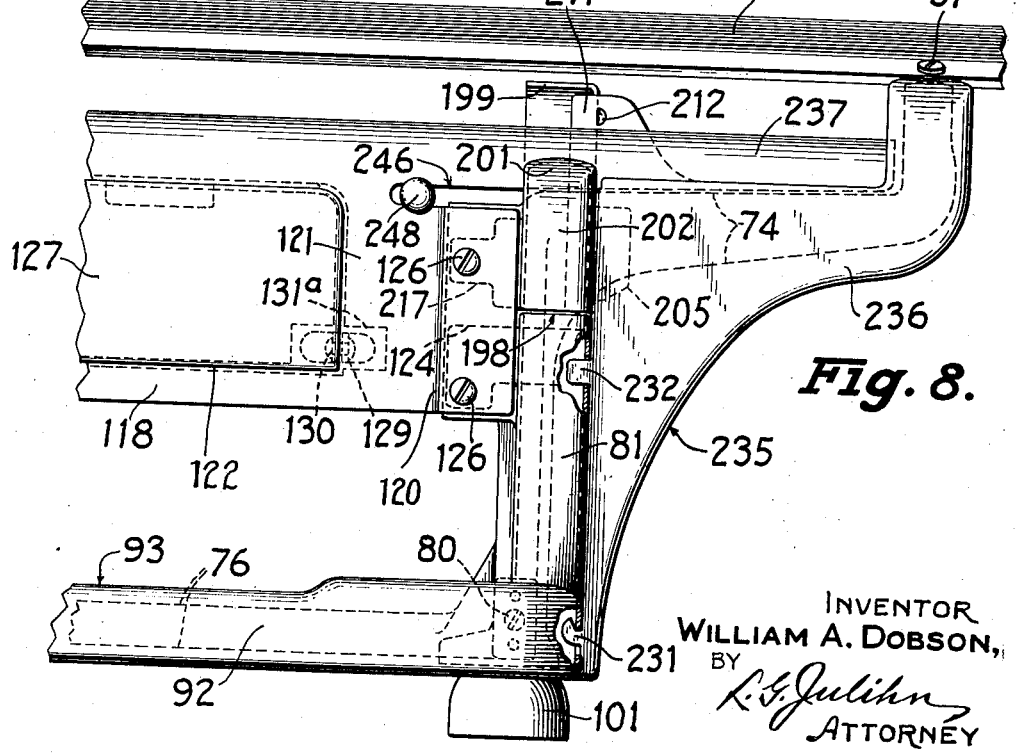
Figure 8 is a front elevation showing the principal-mask part and a supplemental-mask member attached thereto, such supplemental-mask member being for a carriage of greater length than the carriage associated with the supplemental-mask member seen in Figures 6 and 7.

Fitted into the rectangular opening 122 of the front masking-plate 118 is a door 127, Figures 5 and 8, hinged at 128 to ears 129 projecting from the masking-plate 118, as in Figure 5, the back of the door 127 having hinge-ears 130, Figure 5. The back of the door is faced with sound-insulating material 131, such as felt, and the upper margin of the latter engages a stop-bar or bars 132 attached to the back of the front mask-plate 118, the arrangement being such, Figure 5, that the front of the door 127, in closed position, and the front of the mask-plate portion 121 are substantially flush. Attached as at 133 to one of the door ears 130, is a spring 139 which is also attached to the key-lever comb-plate 114 and keeps the door 127 normally closed against the stop-bar 131. The back of the masking-plate 118 is also faced with sound-insulating material, as indicated by the cut-outs 131a, Figure 8, in said material around the ears 129.

A novel finger-knob for the door 127, designed to harmonize with the general mask-structure, is constructed as follows, referring to Figures 9 and 10: The door has a vertical slot 134 that opens at the top and bottom into slots 135. A button 136, Figure 10, is diametrically reduced at each side 137 to form a middle flange 138 that is received in the door so that the reduced sides 137 of the button are shouldered against the face of the door at the side edges of said vertical slot 134. A strap 140 of thin sheet metal, such as brass or soft steel, has a central slot 141 to form spaced bands 142 to engage over the reduced sides 137 of the button and to receive and retain therebetween the middle flange 138 of the button, the flange preferably projecting outside of said bands to stand in relief from the latter. The strap 140 may be initially bent at one end to form a tab 143 which is inserted into one of the transverse slots 135 of the door-opening. With said tab thus inserted and with the flange 138 of the button in place between the strap bands 142, and with an unbent end 144 of the strap inserted in the other transverse slot 135 of the door, said end 144 is then bent, as indicated at 145, against the back of the door to secure the strap 140 and button 136 in place. The button 136 and strap 140 may be finished in contrasting colors, such as black for the button, and chromium plate for the strap 140. The side faces of the button may be concaved or otherwise suitably formed so as to be conveniently engageable by the fingers.

The construction relating to masking the typewriter carriage is as follows: Referring to Figures 5 and 13, the end plates 50 of the case-shiftable platen-frame have upper and lower tabs 147. A cross-bar 148 is rigidly connected, as at 149, to the upper tabs 147 to support a rear paper-table 150. A sound-deadening backing 151, such as felt, of said paper-table serves also to insulate the latter from the cross-bar 148. The paper-table 150 has spot-indentations 152, to recess the heads of screws 153 that secure the paper-table to the cross-bar 148 which may be correspondingly indented, as at 154, to receive the formation of the paper-table indentations 152 and the felt backing 151. The arrangement is such that the paper-table 150 extends downwardly and forwardly so that a slightly downwardly-turned lower edge 156 thereof is contiguous to the rear edge of a paper guide 157 disposed under the platen 49 as in Figure 5. Tongues 158 of the paper-table 150 rest on the lower tabs 147 of the case-shiftable frame-plates 50 and have slots 159 to receive paper-table fastening screws 160 that are threaded into said lower tabs 147. Figure 5 indicates the lower tabs 147 and said screws 160 disposed so that the apron 157 guides a worksheet clear of the heads of said screws 160.

The paper-table 150 is joined as at 163 to a rear apron 164, the paper table and apron 164 thus forming a shed adapted to mask the counter-stop mechanism 63 on the carriage or any other mechanism that is substantially similarly disposed at the back of the carriage. At the sides of the carriage the masking-shed 150, 164 is closed by side pieces 165, Figures 5 and 13. The paper-table 150, the rear apron 164 and the side pieces 165 may be struck up from a single sheet-metal blank in that the latter is bent as at 163, Figure 5, to form the peak of the shed and is further bent as at 166, Figure 13, to form the rear side corners of the shed, and to bring an edge of each side piece 165 against the underside of the paper table as indicated by the seam or seam-line 167, Figures 13 and 17. Left and right channel-shaped corner pieces 168, 169, Figure 17, are secured to the paper-table and the side pieces 165 as by riveting 170 to bind the seam 167. The left-hand corner piece 168 is provided with a slot 171 to receive the end of a cross-bar 172 that supports a side paper guide 173 as will presently be explained. The other end of the cross-bar 172 is received in a slot 174 of the right-hand corner piece 169 and may be detachably secured by a screw 175, shown headed against a flange 173 of the corner piece 169. The screw 175 may be threaded into the channeled cross-bar 172. The cross-bar 172 is of such limited length as to permit it to be moved endwise and tilted for insertion in, or removal from the slots 171, 174 in the corner pieces 168, 169. For lightness in weight and stiffness the cross-bar 172 is made of channel-form such as shown in Figures 5, 13 and 17.

In a modification of the shed 150, 164, Figure 13, the left side piece 165 is formed with a tongue 146 having a slot 146ª to receive the left end of the cross-bar 172. The right side piece 165 is formed with a tongue 155 to receive thereupon the right end of the cross-bar 172 which is detachably secured to said tongue 155 by a screw 161. Simple angle-bars 155ª bind the seams 167.

The side paper-gage 173 is turned up from a strip 176 adapted to overlie the paper-table 150 and the rear apron 164, the latter is formed with a transverse slot 177, Figures 13 and 17, adapted to admit an extension 178 of the side-paper-gage strip 176, said extension being turned under the paper table by a bend 179 and being adapted to ride upon the cross-bar 172 in that it has side ears 180, Figure 14, bent therefrom and formed with T slots 181 to slidably fit said cross-bar 172. Said extension 178 also includes a spring tongue 162, Figure 14, adapted to bear upon the underside of the cross-bar 172 so as to co-operate to frictionally detent the side paper-guide structure 173, 176, 178, 180 at different positions of lateral adjustment. It will be understood that the slot 177 in the rear apron 164 is co-extensive with any desired range of lateral adjustment of said side paper-guide gage structure. The side-gage strip 176 may be formed with a pointer 182 that co-operates with a scale 183 upon the paper-table 150 to indicate the positions of the side guide 173.

The side-gage structure 173, 176, 178, 180 is preferably formed of sheet metal, and the paper-table-overlying strip 176 thereof may have a pad 184, Figure 5, of felt so as to prevent direct contact of said strip 176 with the paper table 150.

The rear portion of the paper table 150 over which the side-gage strip 176 lies may be offset sufficiently below the front portion of the paper-table as by a bend 185, Figure 5, so that said front portion and the side-gage strip 176 are substantially flush. The front end of said strip 176 may also be curled slightly as at 186, Figure 13, to point its end below said front portion of the paper-table.

The inner face of the paper-table apron is also lined with sound-deadening material 187, such as felt. The lower edge of the apron 164 and the edge of its slot 171 may be curled as at 188 to broaden said edges and stiffen the structure.

The rear apron 164 on the carriage and the rear wall 106 of the main mask are arranged, Figure 5, to present a substantially continuous sweep of contour from the bottom or said rear wall 106 to the peak 163 of the shed formed by the paper-table 150 and its rear apron 164. The bottom of said rear wall 106 is shown offset rearwardly relatively to said peak 163 and the bottom edge of the apron 164 so that said sweep of contour is upwardly and forwardly toward said apex, thus conducing to a pleasing stream-line effect in the lines of the mask.

Referring now to Figures 4, 5 and 13, the carriage ends are shrouded by right and left masking-plates 190. Each plate 190 has a contour 191 formed to match substantially the contour 85, 86, 87 and 90 of the main mask side-walls 78, thereby to gain harmonization in the appearance of the masking features of the carriage relative to the main mask. Said carriage-end masking plates 190 have top flanges 193 that may overlie similar flanges 194 of the case-shiftable-frame-side plates 50 and may be secured to said flanges 194 as by screws 195, Figure 5. The top flanges of said carriage-end masking plates 190 may curve downwardly and rearwardly as at 196, Figure 4, so as to be substantially flush with the rear apron 164 and so that the said end masking plates 190 co-operate with the side pieces 165 of the shed 150, 164 to enclose said shed at its side ends.

It has been explained that the side walls 78 of the main mask-portion are spaced apart laterally in accordance with covering, Figure 1, the 11-inch-carriage-machine horns 29, since these horns 29 are offset laterally a comparatively small extent from the bodies of the main-frame side-members 25, 26. Referring now to Figures 6, 7, 9, 11 and 12, the main mask is shown adapted to a 12-inch-carriage machine having front-carriage-rail horns 29 offset laterally by the reach 72 a greater extent than are the horns of the 11-inch-carriage-machine. Such main mask has its side-walls 78ª spaced laterally the same extent as the side-walls 78 for the 11-inch-carriage machine. Thus, there is formed a principal-mark part having a rear wall 106 and a front-keyboard frame cross-sill 92 that are of the same widths as for the 12-inch-carriage machine as for the 11-inch-carriage machine; and the same will be true, as will later appear, for machines having still wider carriages.

The side-walls 78ª of said principal-mask portion are each therefore provided with a front carriage-rail-horn-clearing jog or cut-out defined by the horizontal edge 198 and the vertical edge 199, Figure 9. Said side-walls 78ª may be formed with the same tools or dies that are employed to form the side-walls 78, in that it is only necessary, after the formation of the latter, to cut or adapt the same to form the jog 198, 199. For masking the horn 29 having the wider reach 72, Figure 9, a supplemental-mask member 200 is applied at the jog or cut-out 198, 199 of each side-wall 78ª. Said supplemental member 200 includes a part 201 that copes the horizontal mask-wall edge 198 and has a flange 202 matching the flange 81 that reaches down to the keyboard-side-framing toe 83 of the mask walls 78ª. At its top said flange 202, of each part 201, is turned rearwardly to meet substantially with a lateral extension 203 of the front-masking plate 118 that is provided for the 12-inch-carriage machine. The top-margins of the plates 118 for the machine having different carriage widths may be each curled rearwardly, and it will be obvious that the extensions 203 are substantially extensions of such curled margins or cowls to mask the front-horn reaches 72. Said part 201 may be attached as by a wing 205 thereof and spot-welding or riveting 206, Figure 12, to a front wall 207 of a horn-masking shell 208, said front wall 207 extending, as in Figure 7, downwardly from the front of the 12-inch-carriage rail 30ª. Said horn-masking shell 208 has a side-wall 209 formed as at 210 to hem the underside of said carriage-rail 30ª but without touching the latter, and has a rear wall 211 adapted to face and abut the mask-wall edge 199; said rear wall 211 having a lug or stop 212 pressed out therefrom to set against the outer face of the mask side-wall 78ª. The side-wall 209 of said shell 208 is turned inwardly at the bottom as at 213, to set over the horizontal edge 198 of the mask-wall 78ª. Said shell 208 may be provided with a tongue 214 adapted to abut the main-frame side-member 25 or 26, as at 215, Figure 6. A sound-deadening pad (not shown) may be interposed between said tongue 214 and the side-member 25 or 26. The part 201 has an inwardly-extending fin 217 similar to the fin 124 that was hereinbefore described with reference to the standard-carriage-machine mask, said fin 217 being disposed between the margin portion 119 of the front masking plate 118 and the main-frame boss 117 so as to be clamped by means of the upper screw 126. It will be seen now that said fin 217, screw 126, tongue 214 and stop 212 co-operate to locate and retain the supplemental-mask element 201, 208 in place.

Referring now to Figures 16 and 18, a supplemental-mask member 220 to cover the front carriage-rail horn 29 of a machine having a 14-inch carriage is represented. For such machine the principal mask-portion side-walls 78ª have the same lateral spacing as for the 11 and 12-inch-carriage machines and like the 12-inch-carriage machine, the main-mask side-wall 78ª has the cut-out 198, 199.

The wider-machine supplemental-mask member 220 is made vertically elongate. Therefore, said supplemental-mask member 220 includes a shell 221 having a side-wall 222 that tapers, from a part 223 thereof that is alongside the horn 29, toward the bottom of the main-mask wall 78ª, as shown in Figures 16 and 18. Said side-wall 222 may be formed in one place with a front wall 224 and a rear wall 225 of said shell 221. The front wall 224 has a top portion 226 turned inwardly to meet a lateral extension or cowl 227 of the front mask-plate 118 that is adapted for the 14-inch-carriage machine. Said front wall 224 also has a top portion 228 at a higher level than the top portion 226 so as to be contiguous to the front of the front carriage-rail, such as 30, for the 14-inch machine. Said supplemental-masking member 220 also includes a part 201, Figures 16, 18, which is like the hereinbefore described part 201 for the supplemental-mask member 200 for the 12-inch-carriage machine, and has a wing 205 for attachment to the shell 221 as by riveting 206, Figure 12. The rear wall 225 of the shell 221 of the supplemental-mask member 220 sets facewise against the edge 199 of the mask wall 78ª.

For the 14-inch-carriage machine, the mask-wall 78ª is provided with slots 230 to receive fastening hooks 231 formed on the edges of the front and rear walls 224, 225 of the supplemental-mask-member shell 221. With said hooks 231 inserted in said slots 230, and the supplemental-mask member 220, slightly tilted sidewise, the latter is drawn upwardly so that said hooks interlock with the upper edges of said slots 230. The supplemental-mask member is then turned about said hooks to enter tongues 232, also formed on the side edges of the supplemental-mask-member shell 221, into companion slots 233 formed in the mask wall 78ª, Figure 16. The tongues 232 may fit without vertical play in said slots 233 and the supplemental-mask member is thus retained vertically. The part 201 also has a fin 217 that co-operates to keep the supplemental-mask member 220 in place in that it is interposed between the front masking plate 118 and the boss 117 on the machine frame and is clamped by means of the screw 126. The mask wall 78ª also has a wing 124 for attachment to the boss 117 by means of the lower screw 126 and the mask-plate 118. The rear wall 225 has a stop 212 to set against the mask-wall 78ª, Figure 18.

Figure 8 shows a supplemental-mask member 235 adapted for a machine having a still wider carriage than is represented by the construction of Figure 18. Said supplemental member 235 includes a horn-masking shell 236. A part 201 is attached to said shell 236 as hereinbefore described with reference to the 12 and 14-inch-carriage machines. To co-operate to mask the wider reach 74 for the horn 29, Figure 8, the front mask wall 118 has a lateral extension 237. The mode of attaching the supplemental-mask member 235, Figure 8, to the side-wall 78ª, the latter also having a jog 198, 199 is substantially as described with reference to the 14-inch-carriage machine, said mask-member 235 having the lower hooks 231 and the upper tongues 232 and also having the fin 217 on the part 201 for attachment to the boss 117 of the main frame. One variation suggested by the Figure 8 construction is to have an edge 238 of the shell 236 extend from the part 201 to the horn-masking part 239 of said shell, said edge 238 being adapted to harmonize with the lateral extension 237 of the front mask wall 118, Figure 8.

The several supplemental-mask members 200, 220, 235 may have a sound-proof lining as indicated at 240, Figure 6. To conduce to deadening the machine noises the main mask is adapted, so as to avoid, in the main, contact with the main frame of the machine, as is exemplified at 241, Figures 3 and 5, and by the insulation 102ª between the mask ears 99 and the foot bosses 102 of the main frame. The side-walls 78 or 78ª and the rear wall 106, 108 may also have a sound-proofing lining as exemplified at 234, Figures 5 and 6.

As indicated in Figures 1, 3, 7 and 15, the mask walls 78, or 78ª, may be recessed or niched at their bottom edges as indicated at 242. The fingers of the hands may take hold in such side niches 242 for the purpose of lifting the machine bodily. The niche may be bounded by an inner side-wall 243, a top-wall 244 and end-walls 245, Figure 7. These niche walls may be formed by a die-drawing operation or they may be made separately in whole or in part and attached to the side-walls 78 or 78ª.

The front-mask wall 118 may have a slot 246 through which protrudes a finger-piece 247, Figure 6, the latter in the Underwood machine serving as a ribbon-throw adjuster for selecting different ribbon colors or rendering the ribbon ineffective. The mask-wall 118 may have suitable indexes 248 for the different positions of the finger-piece 247.

It will be seen now that the described mask-structures avail for economically and effectively masking a typewriter, such as the Underwood. The masking-structure around the inner or main frame is easily removed or replaced inasmuch as it is only necessary to remove the rear wall 106, 108, the feet 101 and the front-masking plate 118, all these being easily removable or replaceable, in order to withdraw or replace the principal mask-portion or body that comprises the side walls 78 or 78ª and the cross-sill 92. In wide-carriage machines, the supplemental-mask members, such as 200, 220, or 225, are also easily removable preparatory to removing or replacing the principal-mask part 78ª, 92. Figure 2 illustrates how said principal-mask part 78, 92 or 78ª, 92 may be sprung, mainly at the cross-sill 92, for spreading the side-walls 78 or 78ᵃ in order to facilitate the bringing-together or the separation of said principal-part mask and the main frame. The masking features on the carriage comport with the main mask.

The rear-masking apron 164, on the carriage, and the back wall 106 of the main mask form a substantially unbroken, and therefore, very pleasing sweep of contour and mask the mechanism at the back of the typewriter. The carriage-end-masking plates 190 have their lower-edge contours comport with the contours of the main-mask side-walls 78, thus conducing to congruity of the carriage-masking features and the main mask. Said carriage-end masking plates 190 may have openings, indicated at 249, Figures 4 and 13, for the platen axle 250, the latter having, outside of said plates 190, suitable finger-knobs 251, for rotating the platen 49 manually.

Variations may be resorted to within the scope of the invention, and portions of the improvements may be used without others.

Having thus described my invention, I claim:

1. In framing for a heavy-duty typewriter; a main frame comprising left and right outer side members and left and right carriage-air-supporting horns spreading laterally and upwardly from the upper front corners of said side members; a finishing-mask for said frame comprising a main mask having left and right side walls to mask the main frame side members, each main-mask-side-wall having a jog at an upper front corner thereof so as to extend upwardly behind and forwardly beneath the corresponding horn, two supplemental horn-masking casings each having a front wall, a rear wall and an outer side wall, the rear wall of each casing extending inwardly to the main-mask-side-wall to meet the latter at the jog edge that is behind the horn, each of the main-mask-side-walls having a front rim in form of an inturned forwardly-facing flange extending up toward the jog, and the front of each horn casing being formed with a similar flange matching and capping said inturned side wall flange, the front and rear wall of each horn-casing having edges extending substantially below the jogs and abutting the outer sides of the main-mask-side-walls, at least one of said edges of each horn-casing having a hook-shaped tongue hooked to the edge of a companion aperture in the main-mask-side-wall to detachably fasten the horn casing at its said edge to the main-mask-side-wall; and fastening means detachably securing said supplemental casings and main-mask-side-walls to the main frame.

2. In framing for a heavy-duty typewriter; a main frame comprising left and right outer side members and left and right carriage-rail-supporting horns spreading laterally and upwardly from the upper front corners of said side members; a finishing-mask for said frame comprising a main mask having left and right side walls to mask the main frame side members, each main-mask-side-wall having a jog at an upper front corner thereof so as to extend upwardly behind and forwardly beneath the corresponding horn, two supplemental horn-masking casings each having a front wall, a rear wall and an outer side wall, the rear wall of each casing extending inwardly to the main-mask-side-wall to meet the latter at the jog edge that is behind the horn, each casing extending underneath the horn to meet the main-mask-side-wall and substantially cover the jog edge that is under the horn, each of the main-mask-side-walls having a front rim in the form of an inturned forwardly-facing flange extending up toward the jog, and the front of each horn-casing being formed with a similar flange matching and capping said inturned side wall flange; each horn-casing and each main-mask-side-wall having an internal fin extending laterally inward, the main frame side members having forwardly-facing pads against which the fins abut, a plate forming a front wall of the finishing mask behind the keyboard and overlapping the fins; and securing screws passing through said plate and fins into said main-frame member pads.

WILLIAM A. DOBSON.

CERTIFICATE OF CORRECTION.

Patent No. 2,210,569. August 6, 1940.

WILLIAM A. DOBSON.

It is hereby certified that error appears in the printed specification of the above numbered patent requiring correction as follows: Page 7, first column, line 26-27, for "carriage-air-supporting" read --carriage-rail-supporting--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.